United States Patent
Suzuki

(10) Patent No.: US 8,938,345 B2
(45) Date of Patent: Jan. 20, 2015

(54) LEFT-RIGHT WHEEL DRIVE FORCE DISTRIBUTION CONTROL APPARATUS FOR A VEHICLE

(75) Inventor: Shinichi Suzuki, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 147 days.

(21) Appl. No.: 13/806,634

(22) PCT Filed: Jul. 5, 2011

(86) PCT No.: PCT/JP2011/065393
§ 371 (c)(1),
(2), (4) Date: Dec. 21, 2012

(87) PCT Pub. No.: WO2012/005259
PCT Pub. Date: Jan. 12, 2012

(65) Prior Publication Data
US 2013/0103227 A1    Apr. 25, 2013

(30) Foreign Application Priority Data
Jul. 9, 2010    (JP) .................................. 2010-156660

(51) Int. Cl.
*B60W 30/045* (2012.01)
*B60K 17/34* (2006.01)
(Continued)

(52) U.S. Cl.
CPC .............. *G06F 17/00* (2013.01); *B60K 17/344* (2013.01); *B60K 23/0808* (2013.01); *B60W 30/045* (2013.01); *F16H 48/19* (2013.01); *B60K 23/04* (2013.01); *B60W 10/16* (2013.01); *B60W 2720/28* (2013.01); *B60W 2720/403* (2013.01);
(Continued)

(58) Field of Classification Search
CPC ................... B60K 23/00; F16H 48/20–48/34; B62D 6/00–6/10
USPC ........................... 701/1, 69, 70; 180/245–249
See application file for complete search history.

(56) References Cited

U.S. PATENT DOCUMENTS
2009/0054202 A1    2/2009    Yamakado et al.

FOREIGN PATENT DOCUMENTS
| | | |
|---|---|---|
| JP | 4-19229 A | 1/1992 |
| JP | 11-348595 A | 12/1999 |
| JP | 3116685 B2 | 12/2000 |

OTHER PUBLICATIONS
Sawase et al., JP 07-108841, Apr. 25, 1995 (Machine Translation).*
(Continued)

*Primary Examiner* — Calvin Cheung
*Assistant Examiner* — Courtney Heinle
(74) *Attorney, Agent, or Firm* — Global IP Counselors, LLP

(57) ABSTRACT

A vehicle left-right wheel drive force distribution control apparatus is provided for improving the handling of a vehicle when a steering wheel of the vehicle is being returned toward a center position. The vehicle left-right wheel drive force distribution control apparatus executes a distributed output of a wheel drive force to left and right drive wheels in accordance with a control. The apparatus has a left-right drive force transient control amount computing section that computes a left-right drive force difference transient control amount based on a driver transient turn response. This control amount computed is used in the aforementioned control and is made smaller as the steering wheel is being turned away from a center position than as the steering wheel is being returned toward the center position.

16 Claims, 7 Drawing Sheets

(51) Int. Cl.
*G06F 17/00* (2006.01)
*B60K 17/344* (2006.01)
*B60K 23/08* (2006.01)
*F16H 48/19* (2012.01)
*B60K 23/04* (2006.01)
*B60W 10/16* (2012.01)
*F16H 48/20* (2012.01)
*F16H 61/662* (2006.01)

(52) U.S. Cl.
CPC .... *B60W 2720/406* (2013.01); *F16H 2048/204* (2013.01); *F16H 61/66259* (2013.01)

USPC ............................................ 701/70; 180/248

(56) References Cited

OTHER PUBLICATIONS

Naitou, JP 08-127258, May 21, 1996 (Machine Translation).*
Extended European Search Report for the corresponding European patent application No. 11803593.0 issued on Jun. 18, 2014.

* cited by examiner

LEFT-RIGHT WHEEL DRIVE FORCE DISTRIBUTION CONTROL APPARATUS FOR A VEHICLE

CROSS-REFERENCE TO RELATED APPLICATIONS

This application is a U.S. National stage application of International Application No. PCT/JP2011/065393, filed Jul. 5, 2011, which claims priority claims priority under to Japanese Patent Application No. 2010-156660, filed in Japan on Jul. 9, 2010, the entire contents of which is hereby incorporated by reference.

BACKGROUND

1. Field of the Invention

The present invention generally relates to a proposal for improving a left-right wheel drive force distribution control apparatus that is useful for a vehicle, particularly a four-wheel drive vehicle.

2. Background Information

Japanese Patent Publication No. 3,116,685 presents an example of a conventional left-right wheel drive force distribution control apparatus for a vehicle. The proposed technology relates to a transient control of a left-right wheel drive force distribution that accomplishes a target behavior change (typically a change of yaw rate) corresponding to a change of a vehicle operating state. The left-right wheel drive force distribution is controlled according to a steering wheel operation speed imposed by a driver such that the difference between the drive forces of the left and right wheels is larger when the steering speed is high. As a result, a transient response can be improved during high-speed steering.

SUMMARY

When the vehicle transitions to straight travel after the steering wheel has been operated in a turning direction, a transient control is executed to produce a change of yaw rate even when the steering wheel is returned to a center position. Consequently, even though the driver intends to drive straight, a moment is produced which turns the steering in the direction opposite the direction of the initial turning direction and there is a possibility that the handling performance will decline.

The present invention was conceived in view of this situation and its object is to provide a left-right wheel drive force distribution control apparatus for a vehicle that can improve the handling performance when the steering wheel is being returned toward the center position.

In order to achieve the object, a vehicle left-right wheel drive force distribution control apparatus according to the present invention is configured to control a left-right drive force difference transient control amount based on a transient turn response request from a driver such that the transient control quantity is smaller when the steering wheel is being returned toward the neural position than when the steering wheel is turned away from the center position.

As a result, a desired yaw rate can be obtained when turning the steering wheel away from the center position and normal steering can be obtained when returning the steering wheel to the center position. Thus, excellent handling performance can be obtained.

BRIEF DESCRIPTION OF THE DRAWINGS

Referring now to the attached drawings which form a part of this original disclosure.

FIG. 8A is a time chart of parameters for a situation in which the left-right drive force difference transient control gain is set according to the first embodiment during a lane change.

DETAILED DESCRIPTION OF THE EMBODIMENTS

Figure 1:
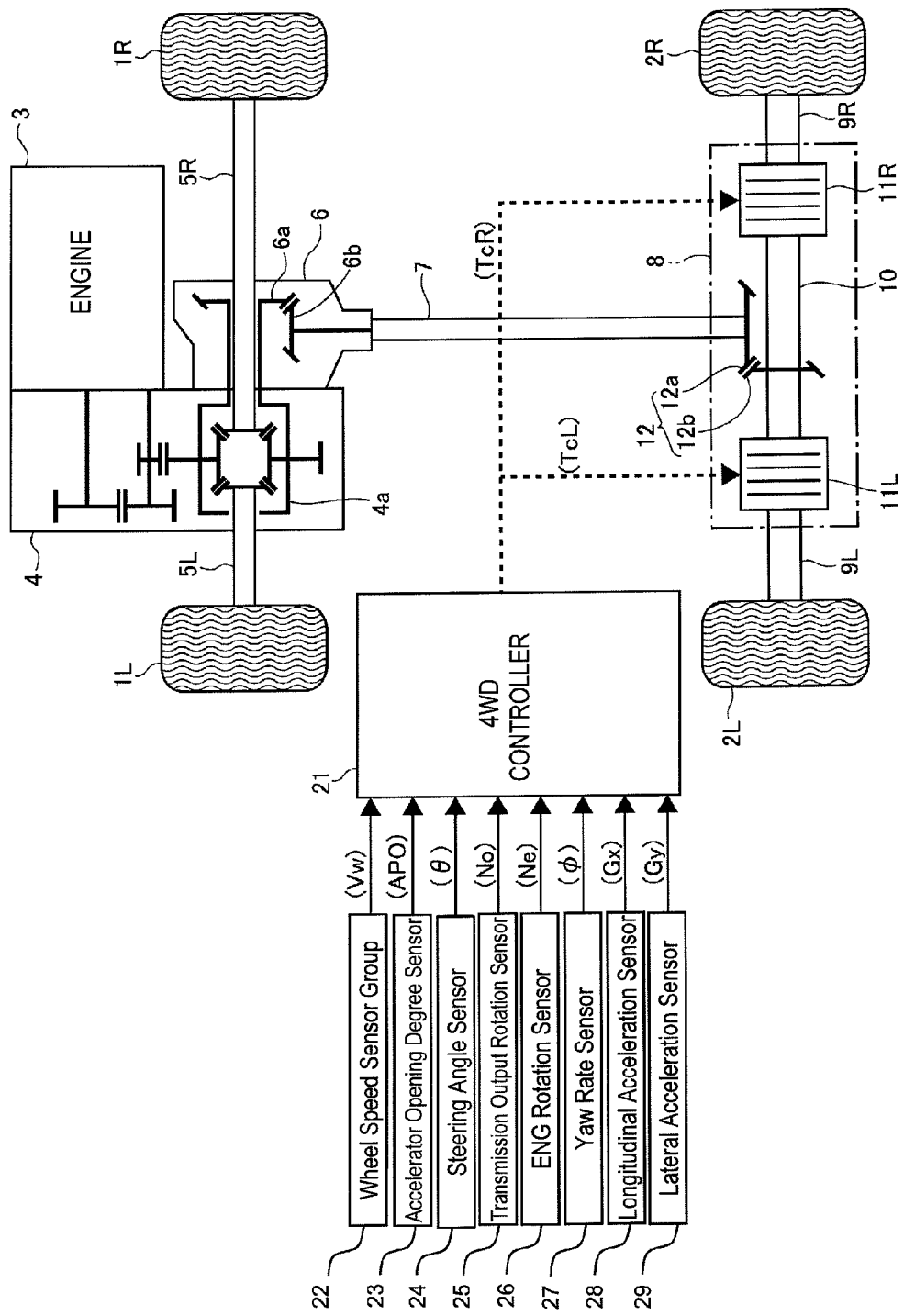
FIG. 1 is a schematic plan view showing a wheel drive train of a four-wheel drive vehicle equipped with a left-right drive force distribution control apparatus according to a first embodiment of the present invention as viewed from above the vehicle. A four-wheel drive control system is also shown.

Embodiments of the present invention are described in detail below with reference to the embodiments in the drawings.

FIG. 1 is a schematic plan view showing a wheel drive train of a four-wheel drive vehicle equipped with a left-right drive force distribution control apparatus according to a first embodiment of the present invention as viewed from above the vehicle. A four-wheel drive control system is also shown. The figure shows left and right front wheels 1L and 1R serving as main drive wheels and left and right rear wheels 2L and 2R serving as subordinate drive wheels. In this patent specification, the term "drive force" does not refer to power but, instead, refers to a torque value.

The reference numeral 3 indicates an engine serving as a prime mover. Torque from the engine 3 is multiplied by a transmission 4 (transaxle that includes a differential gear device 4a) and transferred toward the left and right front wheels 1L and 1R through left and right axle shafts 5L and 5R, thereby serving to drive the left and right front wheels 1L and 1R.

A portion of the drive force exiting the transmission 4 and heading toward the left and right front wheels 1L and 1R is redirected toward the left and right rear wheels 2L and 2R by a transfer case 6. A drive train used to accomplish this redirection will now be explained.

The transfer case 6 has a bevel gear set comprising an input hypoid gear 6a and an output hypoid gear 6b. The input hypoid gear 6a is coupled to a differential gear case serving as an input rotary member of the differential gear device 4a such that the input hypoid gear rotates together with the differential gear case. The output hypoid gear 6b is coupled to a front end of the propeller shaft 7, and the propeller shaft 7 is arranged to extend rearward toward a left-right rear wheel drive force distributing unit 8.

The transfer case 6 sets a gear ratio of the bevel gear set comprising the hypoid gear 6a and the output hypoid gear 6b such that a portion of a drive force heading toward the left and right front wheels 1L and 1R is converted to a higher rotational speed and outputted toward the propeller shaft 7.

The high-speed rotational power outputted to the propeller shaft 7 is distributed to the left and right rear wheels 2L and 2R by the left-right rear wheel drive force distributing unit 8 in accordance with a control explained later. The left-right rear wheel drive force distributing unit 8 has a center shaft 10 that is arranged between the axle shafts 9L and 9R of the left and right rear wheels 2L and 2R and extends along the axial direction of the shafts 9L and 9R. The left-right rear wheel drive force distributing unit 8 also has a left rear wheel clutch (left subordinate drive wheel friction element) 11L and a right rear wheel clutch (right subordinate drive wheel friction element) 11R. The left rear wheel clutch 11L is arranged between the center shaft 10 and the left rear wheel axle shaft 9L and serves to control a connection between the shafts 10 and 9L. The right rear wheel clutch 11R is arranged between the center shaft 10 and the right rear wheel axle shaft 9R and serves to control a connection between the shafts 10 and 9R.

A bevel gear type final reduction gear 12 provides a drive connection between the center shaft 10 and a rearward end of the propeller shaft 7 extending rearward from the transfer case 6. The final reduction gear 12 comprises an input hypoid gear 12a and an output hypoid gear 12b.

The reduction gear ratio of the final reduction gear 12 is set in relation to the speed-increasing gear ratio of the transfer case 6 (speed increasing gear ratio resulting from the bevel gear set comprising the hypoid gear 6a and the output hypoid gear 6b) to such a gear ratio that the portion of the drive force heading toward the left and right front wheels 1L and 1R that is redirected toward the center shaft 10 is delivered to the center shaft 10 with an increased rotational speed. In this embodiment, a total gear ratio of the transfer case 6 and the final reduction gear 12 is set such that a rotational speed of the center shaft 10 is increased with respect to the left and right front wheels 1L and 1R.

The reason for setting the total gear ratio of the transfer case 6 and the final reduction gear 12 in this way will now be explained. If the rotational speed of the center shaft 10 is not increased, then whichever of the left and right rear wheels 2L and 2R is the outside rear wheel during the turn will rotate at a higher rotational speed than the center shaft 10. Under such conditions, if the clutch 11L (or 11R) corresponding to the rear wheel 2L (or 2R) located on the outside of the turn is engaged, then the high rotational speed of that rear wheel will be dragged down by the more slowly rotating center shaft 10 until the rotational speed decreases to the rotational speed of the center shaft 10. Consequently, the center shaft 10 will not be able to transmit a drive force to the rear wheel 2L (or 2R) located on the outside of the turn and it will not be possible to achieve the intended drive force distribution control. As a result, the four-wheel drive control will not function properly.

Therefore, in order to ensure that during a turn the rotational speed of the center shaft 10 does not fall below the rotational speed of the rear wheel 2L (or 2R) located on the outside of the turn and cause the drive force distribution control to be ineffective, the total gear ratio of the transfer case 6 and the final reduction gear 12 is set as explained previously and the center shaft 10 is rotated at an increased rotational speed as explained previously. By rotating the center shaft 10 at an increased rotational speed, the drive force distribution control explained later can be accomplished as intended.

In the wheel drive train of the four-wheel drive vehicle explained above, torque from the engine 3 is multiplied by a gear ratio at the transmission (transaxle) 4 and transferred to the left and right front wheels 1L and 1R, thus driving the left and right front wheels 1L and 1R.

While this is occurring, a portion of the drive force heading toward the left and right front wheels 1L and 1R is transferred successively from the transfer case 6 to the propeller shaft 7, to the final reduction gear 12, and to the center shaft 10 at an increased rotational speed. The holding forces of the clutches 11L and 11R are controlled such that the clutches 11L and 11R slip in accordance with the amount of the rotational speed increase while the left and right rear wheels 2L and 2R are driven. Thus, with the left and right front wheels 1L and 1R and the left and right rear wheels 2L and 2R driven in this way, the vehicle can be operated in four-wheel drive.

In this four-wheel drive vehicle, it is necessary to control the holding forces of the left rear wheel clutch 11L and the right rear wheel clutch 11R. In order to further the performance of this four-wheel drive vehicle when starting into motion from a stopped condition and when accelerating, the vehicle is further configured such that a front-rear wheel drive force distribution control can be executed by controlling a total holding force of the left wheel clutch 11L and the right wheel clutch 11R. Additionally, in order to improve a turning performance of the vehicle and execute a behavior control such that an actual behavior (actual yaw rate, etc.) of the vehicle matches a target based on an operating state and a traveling condition of the vehicle, a left-right wheel drive force distribution control is executed by controlling the holding forces of the left rear wheel clutch 11L and the right rear wheel clutch 11R.

Therefore, a holding force control system of the left rear wheel clutch 11L and the right rear wheel clutch 11R is configured as will now be explained. Each of the left rear wheel clutch 11L and the right rear wheel clutch 11R is an electromagnetic clutch in which the holding force is determined based on a supplied current. A four-wheel drive (4WD) controller 21 accomplishes the aforementioned front-rear wheel drive force distribution control and left-right wheel drive force distribution control by electronically controlling electric currents supplied to the clutches 11L and 11R such that the holding forces of the clutches 11L and 11R correspond to target drive forces TcL and TcR of the left and right rear wheels 2L and 2R, respectively, which are calculated as will be explained later.

In order to compute a target drive force TcL of the left wheel 2L and a target drive force TcR of the right wheel, the four-wheel drive controller 21 receives the following input signals: a signal from a wheel speed sensor group 22 that a wheel speed Vw of each of the wheels 1L, 1R, 2L, and 2R; a signal from an accelerator opening degree sensor 23 that detects an accelerator opening degree APO as an accelerator pedal depression amount; a signal from a steering sensor 24 that detects a steering wheel steering angle θ; a signal from a transmission output rotation sensor 25 that detects a transmission output rotational speed No; a signal from an engine rotation sensor 26 that detects an engine rotational speed Ne; a signal from a yaw rate sensor 27 that detects a yaw rate φ about a vertical axis passing through a center of gravity of the vehicle; a signal from a longitudinal acceleration sensor 28 that detects a longitudinal acceleration Gx of the vehicle; and a lateral acceleration signal 29 that detects a lateral acceleration Gy of the vehicle.

Based on the input information just explained, the four-wheel drive controller 21 computes a left rear wheel target drive force TcL and a right rear wheel target drive TcR to be used for the front-rear wheel drive force distribution control and the left-right wheel drive force distribution control and electronically controls the holding forces (electric currents) of the left rear wheel clutch 11L and the right rear wheel clutch 11R such that the drive forces of the left and right rear wheels 2L and 2R match the target drive forces TcL and TcR.

The front-rear wheel drive force distribution control and the left-right wheel drive force distribution control executed by the four-wheel drive controller 21, i.e., the method of setting the left rear wheel target drive force TcL and the right rear wheel target drive force TcR, will now be explained.

Figure 2:
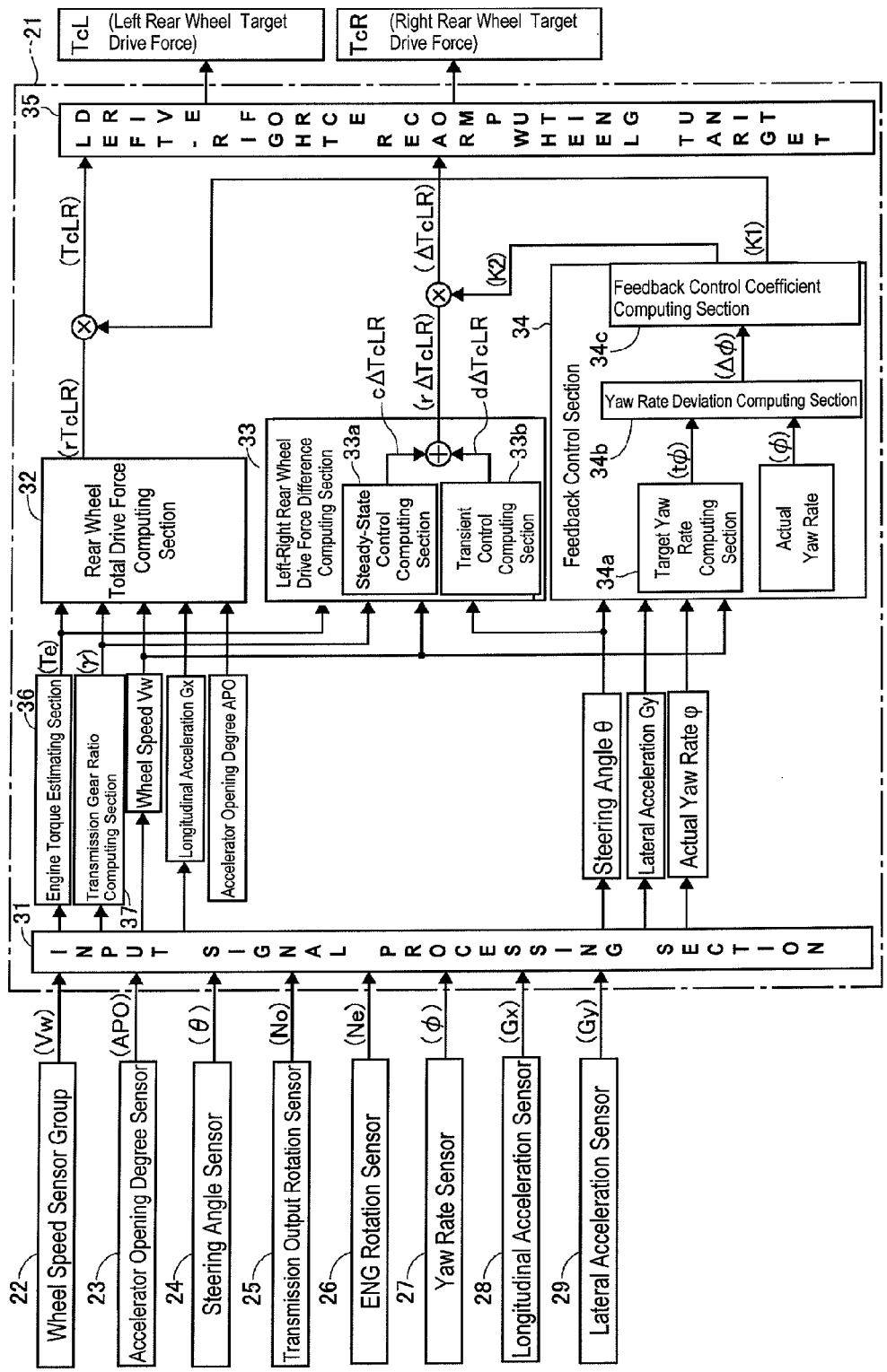
FIG. 2 is a function-specific block diagram of a four-wheel drive controller according to the first embodiment.

As shown in function-specific block diagram of FIG. 2, the four-wheel drive controller 21 comprises an input signal processing section 31, a rear wheel total drive force computing section 32, a left-right rear wheel drive force difference computing section 33, a feedback control section 34, and a left-right rear wheel target drive force computing section 35.

The input signal processing section 31 removes noise from the detection signals of the wheel speed sensor group 22, the accelerator opening degree sensor 23, the steering angle sensor 24, the transmission output rotation sensor 25, the engine rotation sensor 26, the yaw rate sensor 27, the longitudinal acceleration sensor 28, and the lateral acceleration sensor 29 and pre-processes the signals such that they can be used in computations that will be explained later. Among these pre-processed signals, the engine rotational speed Ne and the accelerator opening degree APO are used by an engine torque estimating section 36 to estimate an engine torque Te, and the engine rotational speed Ne and the transmission output rotational speed No are used by a transmission gear ratio computing section 37 to compute a transmission gear ratio $\gamma$.

An example of how the rear wheel total drive force computing section 32 computes a total drive force target value rTcLR (hereinafter called "total drive force rTcLR") for the left and right rear wheels 2L and 2R will now be explained. First, the drive force computing section 32 computes an input torque Ti to the differential gear device 4a based on the engine torque Te and the transmission gear ratio $\gamma$. Next, the computing section 32 calculates left-right front wheel average speed and a left-right rear wheel average speed based on signals (wheel speeds Vw) from the wheel speed sensor group 22 and determines a degree of drive slippage of the left and right front wheels 1L and 1R estimated by comparing the two average speeds. The computing section 32 also determines how much of the input torque Ti to direct toward the left and right rear wheels 2L and 2R in accordance with the degree of drive slippage, the longitudinal acceleration, and the accelerator opening degree APO and sets that amount as a total drive force rTcLR to be directed to the rear wheels.

The larger the aforementioned front wheel slippage is, the larger the total drive force rTcLR to be directed to the rear wheels needs to be in order to suppress the slippage. Meanwhile, the larger the longitudinal acceleration Gx and the accelerator opening degree APO are, the larger the drive force requested by the driver is and the larger the total drive force rTcLR directed to the rear wheels needs to be in order to satisfy the request.

The left-right rear wheel drive force difference computing section 33 has a steady-state control computing section 33a and a transient control computing section 33b and calculates a drive force difference target value r$\Delta$TcLR (hereinafter called drive force difference r$\Delta$TcLR) between the left and right rear wheels 2L and 2R as, for example, will now be explained.

The steady-state control computing section 33a calculates a left-right rear wheel drive force difference steady-state control amount c$\Delta$TcLR for achieving a vehicle turning behavior requested by a driver in a steady manner as will now be explained. The steady-state control computing section 33a estimates a longitudinal acceleration rate Gx of the vehicle based on the engine torque Te and the transmission gear ratio $\gamma$ and a lateral acceleration rate Gy of the vehicle based on a steering angle $\theta$ and a vehicle speed VSP. An under-steering state (state in which an actual turning behavior is insufficient in relation to a target turning behavior) can be ascertained based on a combination of the estimated longitudinal acceleration rate Gx and the lateral acceleration rate Gy. The steady-state control computing section 33a determines a left-right rear wheel drive force difference necessary to resolve the under-steering state as a left-right rear wheel drive force steady-state control amount c$\Delta$TcLR. The reason estimated values of the longitudinal acceleration rate Gx and the lateral acceleration rate Gy are used instead of detected values is that the steady-state control computing section 33a is a feed forward control system and an estimated value matches the actual state of the control better than a detected value, which is a result value.

Thus, while the steering angle $\theta$ is near 0 (while the wheels are not being turned), the left-right rear wheel drive force difference steady-state control amount c$\Delta$TcLR is held at 0 because the lateral acceleration rate Gy equals 0. Conversely, while the steering angle $\theta$ is not near 0 (while the wheels are being turned), the lateral acceleration rate Gy increases as the steering angle $\theta$ and the vehicle speed VSP increase and there is a strong tendency for the vehicle to experience under-steering. Consequently, the left-right rear wheel drive force difference steady-state control amount c$\Delta$TcLR increases. Furthermore, as the longitudinal acceleration rate Gx increases, the tendency for the vehicle to experience under-steering strengthens and the left-right rear wheel drive force difference steady-state control amount c$\Delta$TcLR increases. The steering angle $\theta$ is assumed to be zero at the center position and treated as a value that increases as the steering wheel is turned farther to the right during rightward steering and increases as the steering wheel is turned farther to the left during leftward steering.

Figure 3:
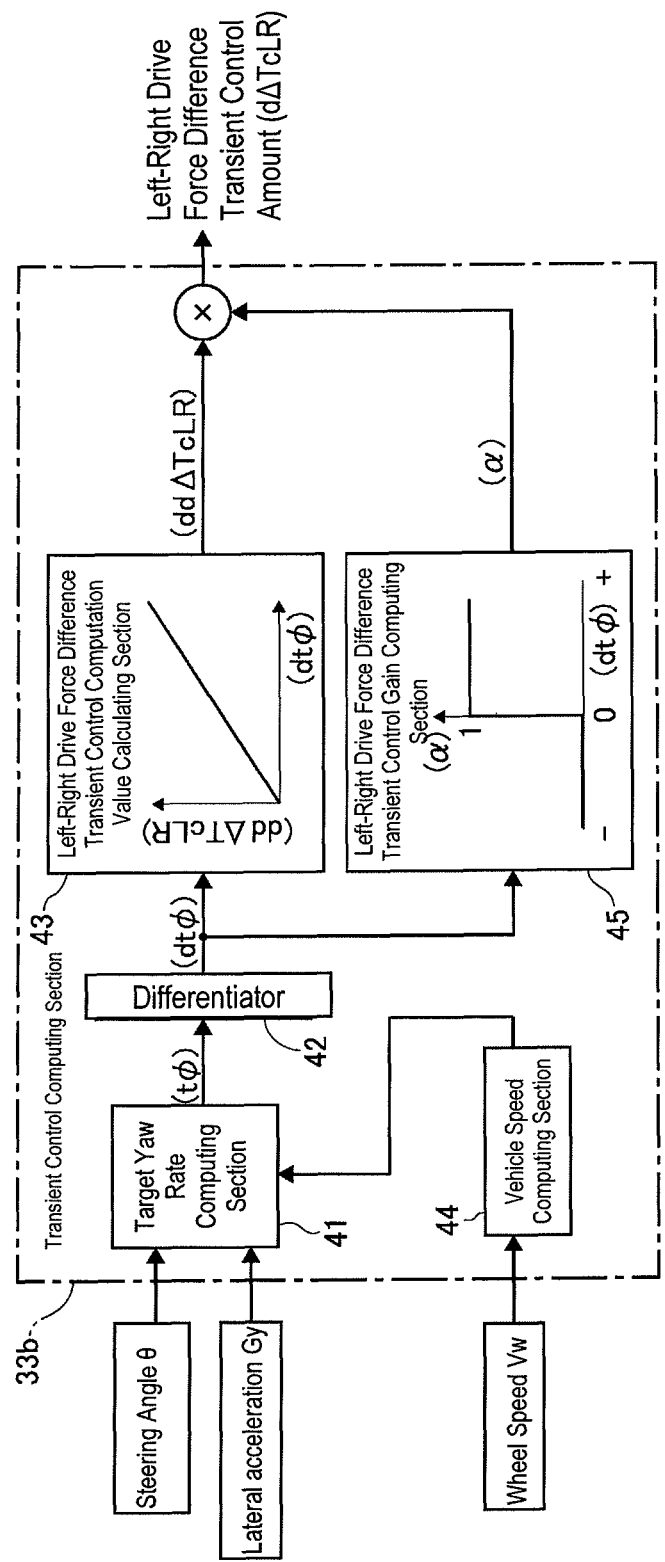
FIG. 3 is a function-specific block diagram of a transient control computing section according to the first embodiment.

The transient control computing section 33b calculates a left-right rear wheel drive force difference transient control amount d$\Delta$TcLR for achieving a turning response transiently requested by a driver through the change rate of the steering angle $\theta$ while traveling at the current vehicle speed VSP. As shown in FIG. 3, the transient control computing section 33b comprises a target yaw rate computing section 41, a differentiator 42, a left-right drive force difference transient control computation value calculating section 43, a vehicle speed computing section 44, and a left-right drive force difference transient control gain computing section 45.

The target yaw rate computing section 41 computes a target yaw rate t$\phi$ desired by the driver based on the steering angle $\theta$ and a vehicle speed VSP calculate by the vehicle speed computing section 44 based on the wheel speeds Vw. The target yaw rate computing section 41 then limits the target yaw rate t$\phi$ based on the lateral acceleration Gy and outputs the target yaw rate t$\phi$. The differentiator 42 differentiates the target yaw rate t$\phi$ to calculate a change rate dt$\phi$ of the target yaw rate. The change rate of the target yaw rate is outputted as a positive value when the steering wheel is being turned away from the center position during a right turn and outputted as a negative value when the steering wheel is being returned toward the center position during a right turn. Similarly, the change rate of the target yaw rate is outputted as a positive value when the steering wheel is being turned away from the center position during a left turn and outputted as a negative value when the steering wheel is being returned toward the center position during a left turn. Thus, the target yaw rate computing section 41 and the differentiator 42 constitute a target yaw rate change rate computing means according to the present invention.

Based on the change rate dtφ of the target yaw rate tφ, the left-right drive force difference transient control computation value calculating section 43 executes a map search to find a left-right rear wheel drive force difference transient control computation value ddΔTcLR to be a basic target value for achieving the turning response transiently requested by the driver. Thus, the left-right drive force difference transient control computation value calculating section 43 constitutes a left-right drive force difference transient control amount computing means according to the present invention. The left-right rear wheel drive force difference transient control computation value ddΔTcLR is set to be larger when the change rate dtφ of the target yaw rate tφ is higher because a higher turning response is desired when the change rate dtφ is higher. The reason the change rate dtφ of the target yaw rate tφ is used instead of a change rate of a yaw rate detection value φ is that the transient control computing section 33b is a feed forward control system and the target yaw rate tφ (which is an estimated value) matches the actual state of the control better than a detected value φ (which is a result value).

The left-right drive force difference transient control gain computing section 45 serves to set a left-right drive force difference transient control gain α. The left-right drive force difference transient control gain α is multiplied by the aforementioned left-right rear wheel drive force difference transient control computation value ddΔTcLR to calculate a left-right rear wheel drive force difference transient control amount dΔTcLR. Thus, the left-right drive force difference transient control gain computing section 45 and the left-right drive force difference transient control computation value calculating section 43 together constitute a left-right drive force difference transient control amount computing means according to the present invention. The left-right drive force difference transient control gain computing section 45 searches the map shown in FIGS. 4 to 6 to find the left-right drive force difference transient control gain α based on the target yaw rate change rate dtφ.

Figure 4:
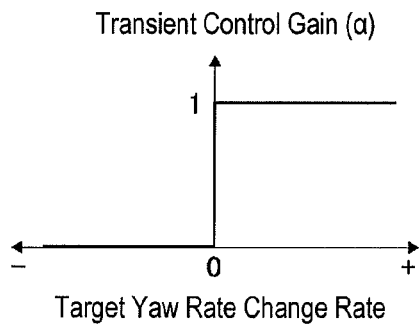
FIG. 4 is a characteristic curve diagram showing an example of a change characteristic of a left-right drive force difference transient control gain used by the transient control computing section of the first embodiment.
Figure 5:
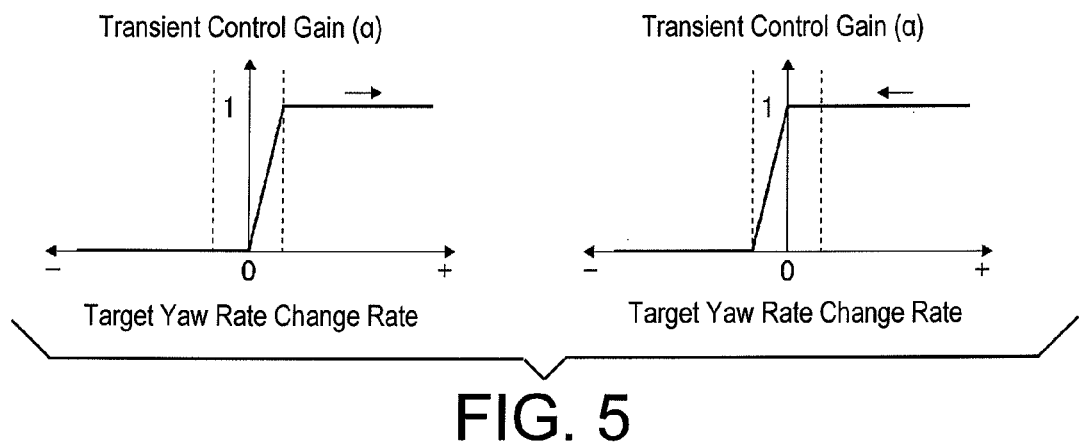
FIG. 5 is a pair of characteristic curve diagrams showing another example of a change characteristic of a left-right drive force difference transient control gain used by the transient control computing section of the first embodiment.
Figure 6:
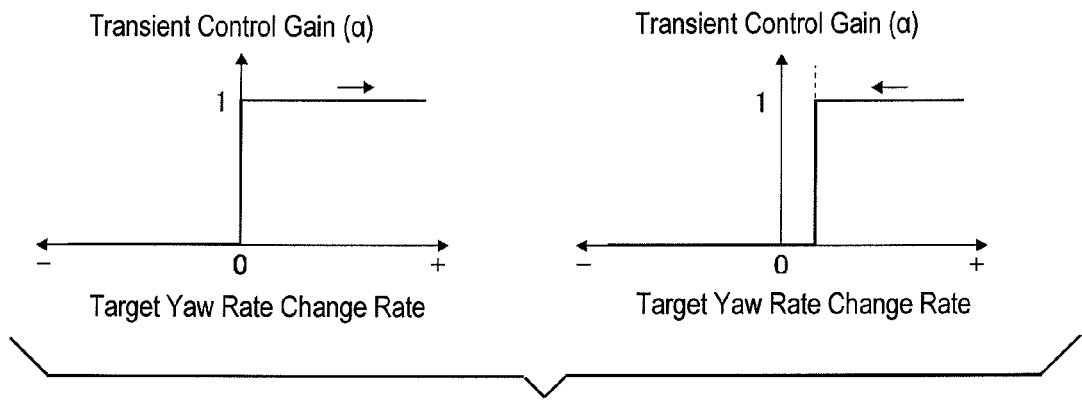
FIG. 6 is a pair of characteristic curve diagrams showing another example of a change characteristic of a left-right drive force difference transient control gain used by the transient control computing section of the first embodiment.

As shown in FIGS. 4 to 6, the left-right drive force difference transient control gain α is a positive value that varies between 0 and 1 in accordance with the target yaw rate change rate dtφ. In any case, when the target yaw rate change rate dtφ is negative (when the steering wheel is returning toward the center position), the left-right drive force difference transient control gain α is set to have a value smaller than 1. FIG. 4 illustrates a case in which the left-right drive force difference transient control gain α is set to 0 (α=0) when the target yaw rate change rate dtφ is a negative value (steering wheel returning to center position) and set to 1 (α=1) when the target yaw rate change rate dtφ is a positive value (steering wheel being turned away from center position).

FIG. 5 illustrates a case in which the timing at which the left-right drive force difference transient control gain α changes from α=0 to α=1 is different depending on whether the target yaw rate change rate dtφ is increasing or the target yaw rate change rate dtφ is decreasing. For example, when the target yaw rate change rate dtφ increases as the steering wheel starts turning away from the center position, the left-right drive force difference transient control gain α gradually increases from α=0 to α=1 while the target yaw rate change rate dtφ is between 0 and a positive value. Meanwhile, when the turning of the steering wheel away from the center position ends and the steering wheel switches to returning toward the center position, the left-right drive force difference transient control gain α is held at α=1 until the target yaw rate change rate dtφ reaches 0. Then the gain α is gradually decreased from α=1 to −α while the rate dtφ transitions from 0 to a prescribed negative value.

FIG. 6 illustrates a case in which the timing at which the left-right drive force difference transient control gain α changes from α=1 to α=0 is different depending on whether the target yaw rate change rate dtφ is increasing or the target yaw rate change rate dtφ is decreasing. For example, when the target yaw rate change rate dtφ increases as the steering wheel starts turning away from the center position, the gain is changed quickly from α=0 to α=1 to ensure the response. Meanwhile, when the turning of the steering wheel ends and the steering wheel switches to returning toward the center position, the gain is held at α=1 until the target yaw rate change rate dtφ reaches a prescribed positive value. When dtφ becomes smaller than the prescribed positive value, the gain is changed to α=0. Thus, the gain is set to α=0 while the steering wheel is being turned away from the center position, i.e., before the transition to returning toward the center position occurs.

As shown in FIG. 3, the transient control computing section 33b multiplies the left-right drive force difference transient control gain α by the left-right rear wheel drive force difference transient control computation value ddΔTcLR to calculate the left-right rear wheel drive force difference transient control amount dΔTcLR. Thus, the left-right rear wheel drive force difference transient control amount dΔTcLR is equivalent to a value obtained by reducing the left-right rear wheel drive force difference transient control computation value ddΔTcLR (which is a basic target value for achieving the turning response transiently requested by the driver) according to the gain α.

If the left-right drive force difference transient control gain α is set to 1 when the target yaw rate change rate dtφ is positive and to 0 when the target yaw rate change rate dtφ is negative as shown in FIG. 4, then the left-right rear wheel drive force difference transient control amount dΔTcLR will be equal to the left-right rear wheel drive force difference transient control computation value ddΔTcLR when the steering wheel is being turned away from the center position and equal to 0 (transient control prohibited) when the steering wheel is being returned toward the center position.

Also, if the left-right drive force difference transient control gain α is set as shown in FIG. 4, then the left-right rear wheel drive force difference transient control amount dΔTcLR will be equal to 0 when the steering wheel is being returned toward the center position and equal to the left-right rear wheel drive force difference transient control computation value ddΔTcLR when the steering wheel is being turned away from the center position.

If the left-right drive force difference transient control gain α is set as shown in FIG. 5, then the left-right rear wheel drive force difference transient control amount dΔTcLR will become equal to the left-right rear wheel drive force difference transient control computation value ddΔTcLR as a result of the gain increasing gradually from α=0 to α=1 in response to the steering speed increasing after the steering wheel starts being turned away from the center position. Meanwhile, after the steering wheel starts returning toward the center position, the gain gradually decreases from α=1 to α=0 as the rate at which the steering wheel is being returned increases and the left-right rear wheel drive force difference transient control computation value dd$\Delta$TcLR becomes equal to 0.

If the left-right drive force difference transient control gain $\alpha$ is set as shown in FIG. 6, then the left-right rear wheel drive force difference transient control amount d$\Delta$TcLR will become equal to the left-right rear wheel drive force difference transient control computation value dd$\Delta$TcLR when the gain changes from $\alpha=0$ to $\alpha=1$ immediately after the steering wheel starts being turned away from the center position. Meanwhile, the left-right rear wheel drive force difference transient control computation value dd$\Delta$TcLR becomes equal to 0 when the gain changes from $\alpha=1$ to $\alpha=0$ at a stage occurring prior to the steering wheel starting to return toward the center position.

The left-right rear wheel drive force difference computing section 33 calculates a sum value of the left-right rear wheel drive force difference steady-state control amount c$\Delta$TcLR calculated by the steady-state control computing section 33a as explained previously and the left-right rear wheel drive force difference transient control amount d$\Delta$TcLR calculated by the transient control computing section 33b as explained previously and sets the sum value as a left-right rear wheel drive force difference r$\Delta$TcLR to serve as a target during the vehicle turning behavior.

However, there are situations in which the actual turning behavior (actual yaw rate $\phi$) actually exhibited by the vehicle in response to the left-right rear wheel drive force difference r$\Delta$TcLR is affected by a lateral wind or other external disturbance and does not match the target turning behavior (target yaw rate t$\phi$) requested through the steering operation performed by the driver. When the actual yaw rate $\phi$ and the target yaw rate t$\phi$ do not match, the feedback control section 34 revises the rear wheel total drive force rTcLR and the rear wheel drive force difference r$\Delta$TcLR as explained below such that a final rear wheel total drive force TcLR and rear wheel drive force difference $\Delta$TcLR are obtained.

The feedback control section 34 has a target yaw rate computing section 34a, a yaw rate deviation computing section 34b, and a feedback control coefficient computing section 34c. The target yaw rate computing section 34a computes a target yaw rate t$\phi$ desired by the driver based on the steering angle $\theta$, the lateral acceleration Gy, and the vehicle speed VSP (which is calculated based on the wheel speeds Vw). The yaw rate deviation computing section 34b computes a yaw rate deviation $\Delta\phi(=\phi-t\phi)$ between the target yaw rate t$\phi$ and a detected actual yaw rate $\phi$.

Based on the yaw rate deviation $\Delta\phi$, the feedback control coefficient computing section 34c determines if the vehicle is in an over-steered state in which the actual yaw rate $\phi$ exceeds the target yaw rate t$\phi$ beyond a dead band, in an under-steered state in which the actual yaw rate $\phi$ is insufficient with respect to the target yaw rate t$\phi$ beyond a dead zone, or in a neutral steering state in which the actual yaw rate $\phi$ is within dead zones in front of and behind the target yaw rate t$\phi$. Based on this determination result, the feedback control coefficient computing section 34c sets a feedback control coefficient K1 (0 or 1) for the rear wheel total drive force rTcLR and a feedback control coefficient K2 (0 or 1) for the rear wheel drive force difference r$\Delta$TcLR.

The feedback control coefficient K1 is multiplied by the rear wheel total drive force rTcLR to calculate a revised final rear wheel total drive force TcLR, and the feedback control coefficient K2 is multiplied by the rear wheel drive force difference r$\Delta$TcLR to calculate a revised final rear wheel drive force difference $\Delta$TcLR.

Regarding setting the feedback control coefficients K1 and K2, if the feedback control coefficient computing section 34c determines that the vehicle is in an over-steered state ($\Phi>t\Phi+$ dead band), then it sets the feedback control coefficient K1 for the rear wheel total drive force rTcLR to 0 and sets the feedback control coefficient K2 for the rear wheel drive force difference r$\Delta$TcLR to 0 in order to eliminate harmful effects caused by four-wheel drive travel. Setting the feedback control coefficient K1 to 0 causes the revised final rear wheel total drive force TcLR to be 0, and setting the feedback control coefficient K2 to 0 causes the revised final rear wheel drive force difference $\Delta$TcLR to be 0. This means the vehicle travels in two-wheel drive and, as a result, the harmful effects that could result from traveling in four-wheel drive while in an over-steered state can be eliminated.

If the feedback control coefficient computing section 34c determines that the vehicle is in an under-steered state ($\Phi<t\Phi-$dead band), then, although there are no harmful effects caused by four-wheel drive travel, the feedback control coefficient computing section 34c sets the feedback control coefficient K1 for the rear wheel total drive force rTcLR to 1 and sets the feedback control coefficient K2 for the rear wheel drive force difference r$\Delta$TcLR to 0 in order to eliminate harmful effects caused by setting a drive force difference between the left and right rear wheels. Setting the feedback control coefficient K1 to 1 causes the revised final rear wheel total drive force TcLR to be set as TcLR=rTcLR, and setting the feedback control coefficient K2 to 0 causes the revised final rear wheel drive force difference $\Delta$TcLR to be 0. This means that the vehicle is operated in four-wheel drive but a drive force difference is not set between the left and right rear wheels. As a result, excellent traction can be enjoyed by operating in four-wheel drive while in an under-steered state while eliminating the harmful effects of setting a drive force difference between the left and right rear wheels.

If the feedback control coefficient computing section 34c determines that the vehicle is in a neutral steering state (t$\Phi-$dead band$<\Phi<$t$\Phi+$dead band), then the feedback control coefficient computing section 34c sets the feedback control coefficient K1 for the rear wheel total drive force rTcLR to 1 and sets the feedback control coefficient K2 for the rear wheel drive force difference r$\Delta$TcLR to 1 because there are no harmful effects caused by four-wheel drive travel and no harmful effects caused by setting a drive force difference between the left and right rear wheels. Setting the feedback control coefficient K1 to 1 causes the revised final rear wheel total drive force TcLR to be set as TcLR=rTcLR, and setting the feedback control coefficient K2 to 1 causes the revised final rear wheel drive force difference $\Delta$TcLR to be set as $\Delta$TcLR=r$\Delta$TcLR. This means that the vehicle is operated in four-wheel drive and a drive force difference is set between the left and right rear wheels.

Figure 7:
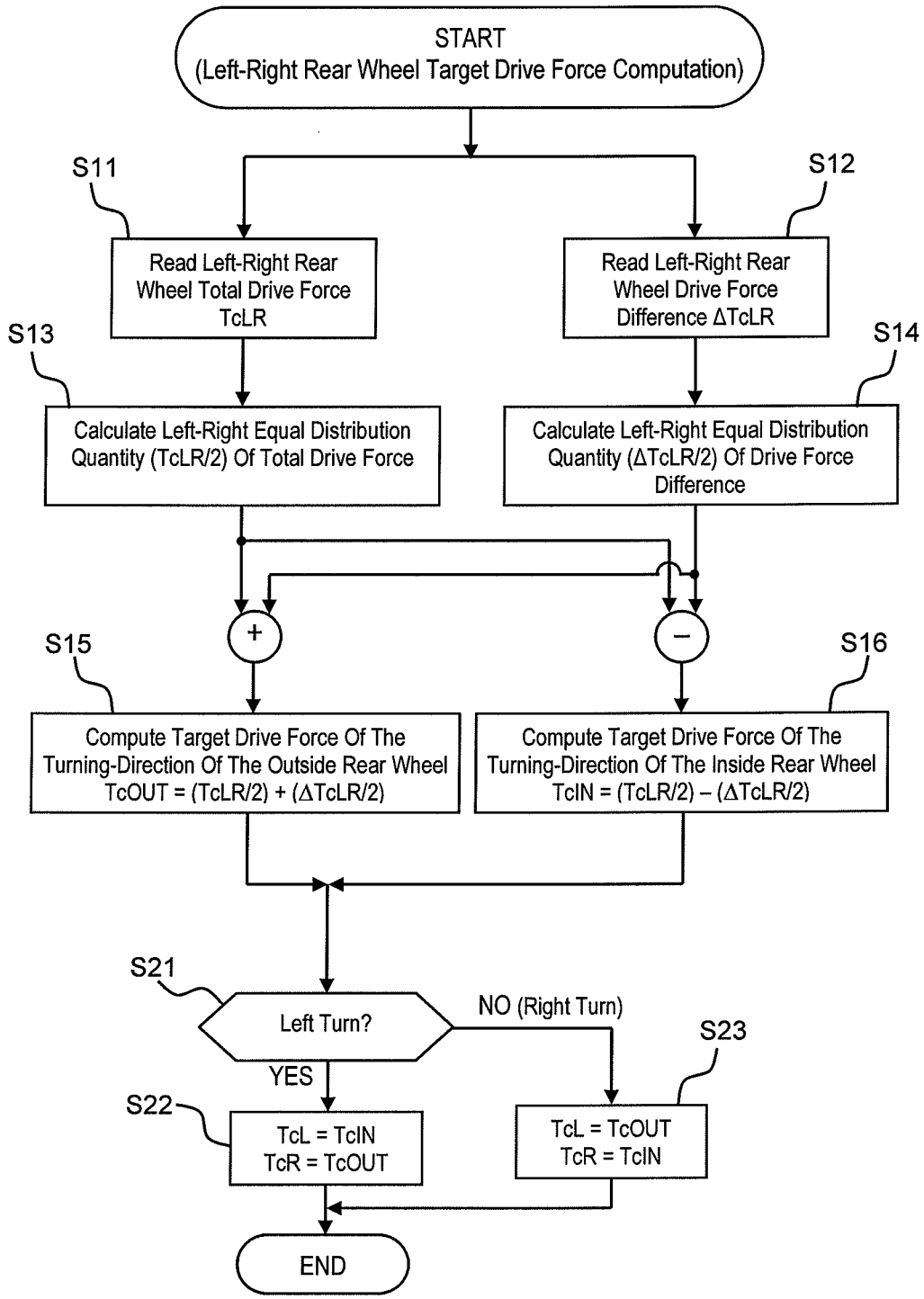
FIG. 7 is a flowchart showing a process by which a left-right rear wheel target drive force computing section according to the first embodiment computes left and right rear wheel target drive forces.

Based on the process shown in FIG. 7, the left-right rear wheel target drive force computing section 35 calculates a left rear wheel target drive force TcL and a right rear wheel target drive force TcR that satisfy both the left-right rear wheel total drive force TcLR and the left-right rear wheel drive force difference $\Delta$TcLR, which are to be the revised final targets.

In step S11, the left-right rear wheel target drive force computing section 35 reads the final rear wheel total drive force TcLR revised by the previously explained feedback control, and in step S12, the left-right rear wheel target drive force computing section 35 reads the final left-right rear wheel drive force difference $\Delta$TcLR revised by the feedback control.

In step S13 the left-right rear wheel target drive force computing section 35 calculates a left-right equal distribution quantity TcLR/2 of the rear wheel total drive force TcLR read in step S11, and in step S14 the left-right rear wheel target drive force computing section 35 calculates a left-right equal distribution quantity $\Delta TcLR/2$ of the rear wheel drive force difference $\Delta TcLR$ read in step S12. In step S15, the left-right rear wheel target drive force computing section 35 adds the rear wheel drive force difference left-right equal distribution quantity $\Delta TcLR/2$ to the rear wheel total drive force left-right equal distribution quantity $TcLR/2$ to calculate a target drive force $TcOUT$ (=$TcLR/2+\Delta TcLR/2$) of the turning-direction outside rear wheel. In step S16, the left-right rear wheel target drive force computing section 35 subtracts the rear wheel drive force difference left-right equal distribution quantity $\Delta TcLR/2$ from the rear wheel total drive force left-right equal distribution quantity $TcLR/2$ to calculate a target drive force $TcIN$ (=$TcLR/2-\Delta TcLR/2$) of the turning-direction inside rear wheel.

Thus calculated, the target drive force $TcOUT$ of the turning-direction outside rear wheel and the target drive force $TcIN$ of the turning-direction inside rear wheel serve as a target drive force of the turning-direction outside rear wheel and a target drive force of the turning-direction inside rear wheel that achieve both the rear wheel total drive force $TcLR$ and the rear wheel drive force difference $\Delta TcLR$.

In step S21 and subsequent steps, the left-right rear wheel target drive force computing section 35 sets the left rear wheel target drive force $TcL$ and the right rear wheel target drive force $TcR$ based on the target drive force $TcOUT$ of the turning-direction outside rear wheel and the target drive force $TcIN$ of the turning-direction inside rear wheel as will now be explained. First, in step S21, the left-right rear wheel target drive force computing section 35 determines if the vehicle is undergoing a left turn or a right turn based on the steering angle $\theta$ and the yaw rate $\Phi$.

If it is a left turn, then in step S22 the left-right rear wheel target drive force computing section 35 sets the inside wheel target drive force $TcIN$ as the target drive force $TcL$ of the left rear wheel (which is the turning-direction inside wheel) and sets the outside wheel target drive force $TcOUT$ as the target drive force $TcR$ of the right rear wheel (which is the turning-direction outside wheel). Conversely, if it is a right turn, then in step S23 the left-right rear wheel target drive force computing section 35 sets the outside wheel target drive force $TcOUT$ as the target drive force $TcL$ of the left rear wheel (which is the turning-direction outside wheel) and sets the inside wheel target drive force $TcIN$ as the target drive force $TcR$ of the right rear wheel (which is the turning-direction inside wheel).

The four-wheel drive controller 21 shown in FIG. 1 controls electric currents supplied to the left rear wheel clutch 11L and the right rear wheel clutch 11R such that the holding forces of the left rear wheel clutch 11L and the right rear wheel clutch 11R correspond to the left wheel target drive force $TcL$ and the right rear wheel target drive force $TcR$ set by the computing section 35 shown in FIG. 2 as explained previously.

Figure 8:
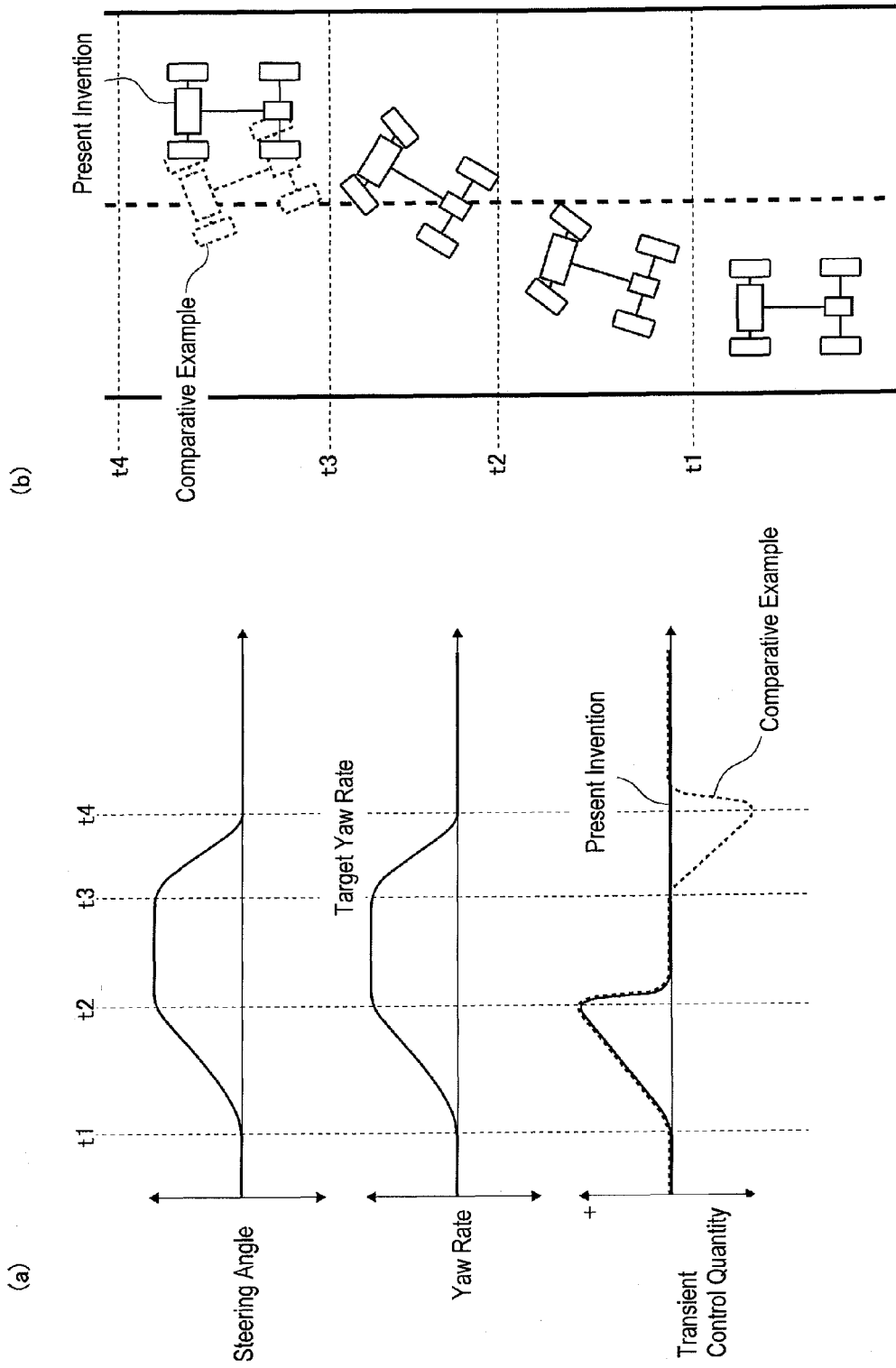
FIG. 8 B is a time chart expressing movements of the vehicle in which an initial state is assumed to be a state of traveling in the left lane of a straight road having two lanes per side.

The operation of the first embodiment will now be explained. FIG. 8 is a time chart for a situation in which the left-right torque difference transient control gain is set according to the first embodiment during a lane change. Here, the left-right drive force difference transient control gain is set according to the characteristic shown in FIG. 4. FIG. 8 (*a*) is a time chart of parameters, and FIG. 8 (*b*) is a time chart expressing movements of the vehicle. An initial state is assumed to be a state of traveling in the left lane of a straight road having two lanes per side.

At a time t1, the driver starts turning the steering wheel rightward in order to change from the left lane to the right lane. When this is done, the steering angle $\theta$ increases and the target yaw rate change rate $dt\Phi$, too, is a positive value. Thus, the steering wheel is being turned away from the center position and the left-right drive force difference transient control gain $\alpha$ is set to 1. As a result, the left-right rear wheel drive force difference transient control amount $d\Delta TcLR$ is the same as the left-right rear wheel drive force difference transient control computation value $dd\Delta TcLR$ and a yaw rate corresponding to the driver's steering operation is produced.

At a time t2, the driver starts stabilizing the steering wheel operation at a particular steering angle $\theta$, i.e., holding the steering wheel still, and the target yaw rate change rate $dt\Phi$ decreases. As a result, the left-right drive force difference transient control gain $\alpha$ changes from 1 to 0 and the left-right rear wheel drive force difference transient control computation value $dd\Delta TcLR$ also goes to 0.

At a time t3, the vehicle has moved from the left lane to the right lane and the driver starts returning the steering wheel from the held state. Thus, the steering wheel is in a state of returning toward the center position because the steering angle $\theta$ is decreasing and the target yaw rate change rate $dt\Phi$ is a negative value. At this stage, if the gain $\alpha$ were not set as it is in the first embodiment, then the left-right rear wheel drive force difference transient control computation value $dd\Delta TcLR$ would be outputted according to the target yaw rate change rage $dt\Phi$. Consequently, at a time t4 when the driver completed the lane change, a transient yaw rate oriented toward the lane from which the driver changed would occur even though the driver wishes to travel in a straight line and the vehicle would exhibit an over-steered characteristic such that the sufficient handling performance could not be obtained.

Conversely, in the first embodiment, when the target yaw rate change rate $dt\Phi$ has a negative value, i.e., when the steering wheel is being returned toward the center position, the gain $\alpha$ is set to 0 such that the left-right rear wheel drive force difference transient control computation value $dd\Delta TcLR$ also goes to 0. As a result, the vehicle can travel straight in a stable manner even after the time t4 when the lane change is completed. Thus, a neutral steering characteristic is achieved and an excellent handling performance can be obtained.

Effects that are obtained with a left-right wheel (left and right rear wheels) drive force distribution control for a four-wheel drive vehicle according to the embodiment explained heretofore will now be explained.

(1) The transient control computing section 33b is configured as explained previously with reference to FIG. 3. Based on a transient turn response request from the driver, the left-right drive force difference transient control gain computing section 45 sets the left-right drive force difference transient control gain $\alpha$ in accordance with the target yaw rate change rate $dt\phi$, i.e., such that the left-right drive force difference transient control gain $\alpha$ is smaller when the steering wheel is being returned toward the center position than when the steering wheel is being turned away from the center position as exemplified in any of FIGS. 4 to 6. The transient control computing section 33b then multiplies the left-right rear wheel drive force difference transient control computation value $dd\Delta TcLR$ by the left-right drive force difference transient control gain $\alpha$ to calculate the left-right rear wheel drive force difference transient control amount $d\Delta TcLR$ and contributes the same to the left-right wheel (left and right rear wheels) drive force distribution control. As a result, a desired yaw rate can be obtained when turning the steering wheel away from the center position and neutral steering can be obtained when returning the steering wheel to the center position. Thus, excellent steering performance can be obtained. In particular, when changing lanes, the lane change can be executed with good response and, after the lane change, the vehicle behavior can be stabilized with neutral steering.

(2) The left-right drive force difference transient control gain computing section 45 is configured to contribute to the control by withholding the left-right rear wheel drive force difference transient control computation value ddΔTcLR (transient control amount) when the steering wheel is being returned toward the center position. More specifically, it sets the gain α to 0 when the steering wheel is being returned toward the center position, i.e., when the target yaw rate change rate is a negative value. As a result, an even better handling performance can be obtained.

(3) As explained previously in the embodiment, the left-right rear wheel drive force difference transient control computation value ddΔTcLR is subjected to a determination of whether the steering wheel is being turned away from or returned toward the center position based on the target yaw rate change rate as shown in any of FIGS. 4 to 6. That is, the target yaw rate change rate dtΦ is a value calculated based on the vehicle speed VSP and the steering angle θ and is the value desired by the driver. By determining the steering state of the driver based on this value, the left-right drive force difference transient control gain α can be set in a feed-forward manner and a good handling performance can be obtained. For example, the left-right drive force difference transient control gain α is changed based on the target yaw rate change rate both in the case shown in FIG. 5 in which the left-right drive force difference transient control gain α is changed gradually and in the case shown in FIG. 6 in which the left-right drive force difference transient control gain α is changed at a prescribe positive value occurring while the steering wheel is being turned. Thus, the gain can be changed at a value that takes into account both the steering state and the traveling state of the vehicle and in a way that better reflects the traveling state.

(4) The left-right drive force difference transient control computation value calculating section 4 is configured to find a left-right rear wheel drive force difference transient control computation value ddΔTcLR to serve as a basic target value for achieving a turning response transiently requested by the driver through a steering operation. Therefore, the transient control computing section 33*b* is a feed forward control system and it can accomplish a control that better matches the actual state of the control by using the target yaw rate tΦ (which is an estimated value) instead of the detected value Φ (which is a result value).

Figure 9:
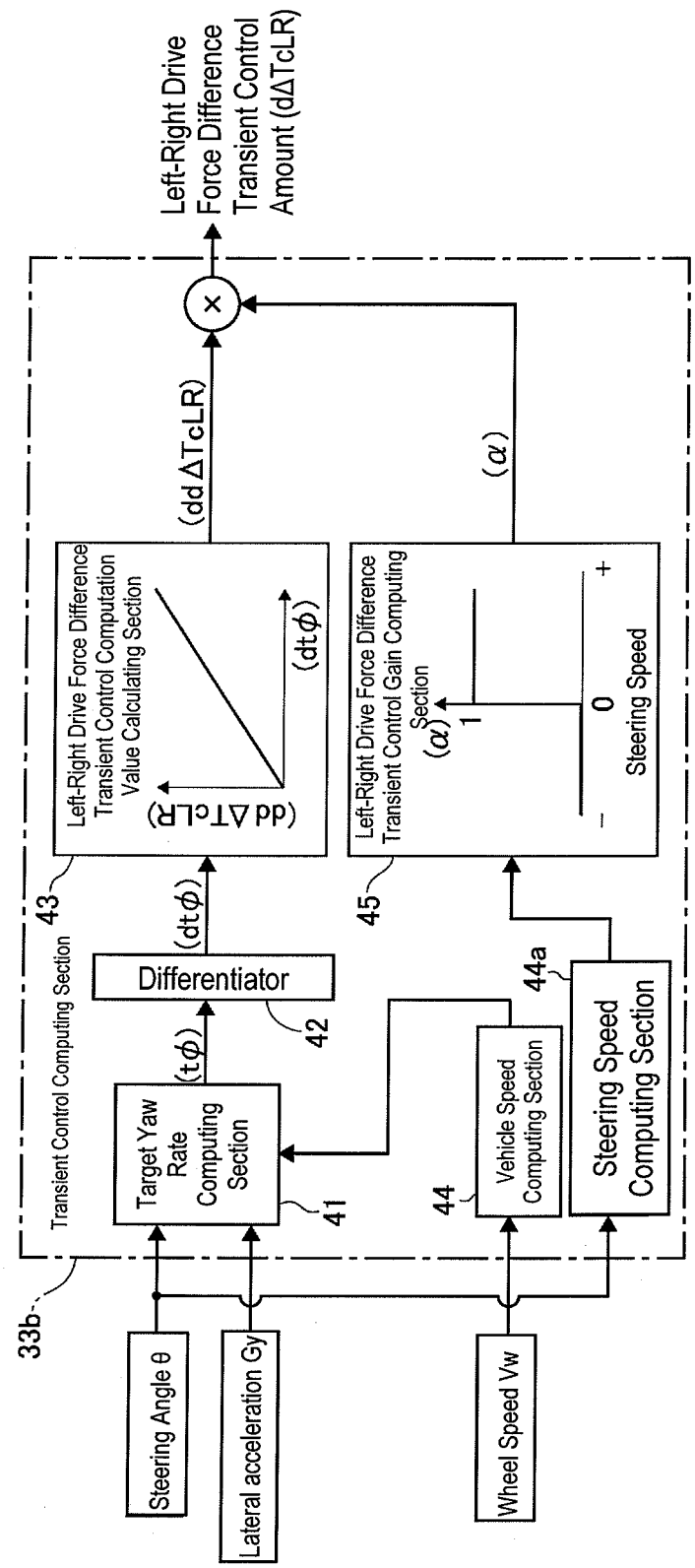
FIG. 9 is a function-specific block diagram of a transient control calculation section according to the second embodiment.

A second embodiment will now be explained. The second embodiment is basically the same as the first embodiment, so only the differences will be explained. FIG. 9 is a function-specific block diagram of a transient control calculation section according to the second embodiment. The transient control computing section 33*b* calculates a left-right rear wheel drive force difference transient control amount dΔTcLR for achieving a turning response transiently requested by a driver through the change rate of the steering angle θ while traveling at the current vehicle speed VSP.

As shown in FIG. 9, the transient control computing section 33*b* comprises a target yaw rate computing section 41, a differentiator 42, a left-right drive force difference transient control computation value calculating section 43, a vehicle speed computing section 44, a steering speed computing section 44*a*, and a left-right drive force difference transient control gain computing section 45. The steering speed computing section 44*a* computes a change rate of the steering angle θ and outputs a positive value if the steering wheel is being turned away from the center position during a right turn and a negative value if the steering wheel is being returned rightward toward the center position. Similarly, the change rate is outputted as a positive value if the steering wheel is being turned away from the center position during a left turn and outputted as a negative value when the steering wheel is being returned toward the center position during a left turn. As a result, the same value as the target yaw rate change rate is outputted if one takes into account the plus sign or the minus sign.

The target yaw rate computing section 41 computes a target yaw rate tφ desired by the driver based on the steering angle θ and a vehicle speed VSP calculate by the vehicle speed computing section 44 based on the wheel speeds Vw. The target yaw rate computing section 41 limits the target yaw rate tφ based on the lateral acceleration Gy. The differentiator 42 differentiates the target yaw rate tφ to calculate a change rate dtφ of the target yaw rate. Thus, the target yaw rate computing section 41 and the differentiator 42 constitute a target yaw rate change rate computing means according to the present invention.

The left-right drive force difference transient control gain computing section 45 serves to set a left-right drive force difference transient control gain α. The left-right drive force difference transient control gain α is multiplied by the aforementioned left-right rear wheel drive force difference transient control computation value ddΔTcLR to calculate a left-right rear wheel drive force difference transient control amount dΔTcLR. Thus, the left-right drive force difference transient control gain computing section 45 and the left-right drive force difference transient control computation value calculating section 43 together constitute a left-right drive force difference transient control amount computing means according to the present invention. The left-right drive force difference transient control gain computing section 45 find the left-right drive force difference transient control gain α based on the steering speed by searching a map that is like those shown in, for example, FIGS. 4 to 6 except that the horizontal axis has been changed from the target yaw rate change rate dtφ to the steering speed. The basic operation and effects are the same as the first embodiment and there are no particular differences regarding the reference numerals. However, a difference is that the target yaw rate change rate dtΦ is a value calculated based on parameters that include the vehicle speed VSP while the steering speed does not include the vehicle speed VSP as a parameter.

(5) As explained previously in the second embodiment, the left-right rear wheel drive force difference transient control computation value ddΔTcLR is subjected to a determination of whether the steering wheel is being turned away from or returned toward the center position based on the steering speed instead of based on the target yaw rate change rate as shown in any of FIGS. 4 to 6. Thus, based on determining the steering state, the left-right drive force difference transient control gain α can be set in a feed-forward manner and a good handling performance can be obtained.

Although the present invention is explained based on the embodiments, the invention is not limited to these embodiments and other configurations are acceptable. For example, in the embodiments, the target yaw rate change rate dtΦ is computed based on the vehicle speed VSP and the steering angle (steering operation of the driver) dtf and the left-right rear wheel drive force difference transient control computation value (transient component of the left-right drive force difference) ddΔTcLR is based on the target yaw rate change rate dtΦ. However, the computation method is not limited to this and any method is acceptable so long as the left-right rear wheel drive force difference transient control computation value ddΔTcLR is computed based on a transient turning response request of the driver. For example, it is acceptable to use an actual value instead of a target value.

The invention claimed is:
1. A vehicle left-right wheel drive force distribution control apparatus comprising:
a controller programmed to execute a distributed output of a wheel drive force to left and right drive wheels in accordance with a front-rear wheel drive force distribution control, the controller including a left-right drive force difference transient control amount computing section that computes a left-right drive force difference transient control amount based on a driver requested transient turn response,
the left-right drive force difference transient control amount computed by the left-right drive force difference transient control amount computing section being used in the front-rear wheel drive force distribution control such that the left-right drive force difference transient control amount is smaller as a steering wheel is being turned away from a center position than as the steering wheel is being returned toward the center position, and
the left-right rear wheel drive force difference transient control amount being gradually increased as the steering wheel turning speed increases as the steering wheel starts being turned away from the center position, and gradually decreased as the steering wheel turning speed increases as the steering wheel starts returning toward the center position.

2. The vehicle left-right wheel drive force distribution control apparatus according to claim 1, wherein
the left-right drive force difference transient control amount computing section is further programmed to determine a turning operation of the steering wheel with respect to the center position based on a target yaw rate change rate.

3. The vehicle left-right wheel drive force distribution control apparatus according to claim 1, wherein
the left-right drive force difference transient control amount computing section is further programmed to determine a turning operation of the steering wheel with respect to the center position based on a steering speed.

4. The vehicle left-right wheel drive force distribution control apparatus according to claim 1, further comprising
a target yaw rate change rate computing section programmed to compute a change rate of a target yaw rate in accordance with a change of a vehicle operating condition,
the left-right drive force difference transient control amount computing section being further programmed to compute the left-right drive force difference transient control amount to achieve the target yaw rate change rate.

5. The vehicle left-right wheel drive force distribution control apparatus according to claim 2, further comprising
a target yaw rate change rate computing section programmed to compute a change rate of a target yaw rate in accordance with a change of a vehicle operating condition,
the left-right drive force difference transient control amount computing section being further programmed to compute the left-right drive force difference transient control amount to achieve the target yaw rate change rate.

6. The vehicle left-right wheel drive force distribution control apparatus according to claim 3, further comprising a target yaw rate change rate computing section programmed to compute a change rate of a target yaw rate in accordance with a change of a vehicle operating condition,
the left-right drive force difference transient control amount computing section being further programmed to compute the left-right drive force difference transient control amount to achieve the target yaw rate change rate.

7. A vehicle left-right wheel drive force distribution control apparatus comprising:
a controller programmed to execute a distributed output of a wheel drive force to left and right drive wheels in accordance with a front-rear wheel drive force distribution control, the controller including a left-right drive force difference transient control amount computing section that computes a left-right drive force difference transient control amount based on a driver requested transient turn response,
the left-right drive force difference transient control amount computed by the left-right drive force difference transient control amount computing section being used in the front-rear wheel drive force distribution control such that the left-right drive force difference transient control amount is smaller as a steering wheel is being turned away from a center position than as the steering wheel is being returned toward the center position, and
the left-right rear wheel drive force difference transient control amount being increased immediately as the steering wheel starts being turned away from the center position and decreased at a stage occurring before the steering wheel starts returning toward the center position.

8. The vehicle left-right wheel drive force distribution control apparatus according to claim 7, wherein
the left-right drive force difference transient control amount computing section is further programmed to withhold the left-right drive force difference transient control amount from being used in the front-rear wheel drive force distribution control while the steering wheel is determined to be in a state of being returned toward the center position.

9. The vehicle left-right wheel drive force distribution control apparatus according to claim 7, wherein
the left-right drive force difference transient control amount computing section is further programmed to determine a turning operation of the steering wheel with respect to the center position based on a target yaw rate change rate.

10. The vehicle left-right wheel drive force distribution control apparatus according to claim 7, wherein
the left-right drive force difference transient control amount computing section is further programmed to determine a turning operation of the steering wheel with respect to the center position based on a steering speed.

11. The vehicle left-right wheel drive force distribution control apparatus according to claim 7, further comprising
a target yaw rate change rate computing section programmed to compute a change rate of a target yaw rate in accordance with a change of a vehicle operating condition,
the left-right drive force difference transient control amount computing section being further programmed to compute the left-right drive force difference transient control amount to achieve the target yaw rate change rate.

12. The vehicle left-right wheel drive force distribution control apparatus according to claim 8, wherein the left-right drive force difference transient control amount computing section is further programmed to determine a turning operation of the steering wheel with respect to the center position based on a target yaw rate change rate.

13. The vehicle left-right wheel drive force distribution control apparatus according to claim 12, further comprising a target yaw rate change rate computing section programmed to compute a change rate of a target yaw rate in accordance with a change of a vehicle operating condition, the left-right drive force difference transient control amount computing section being further programmed to compute the left-right drive force difference transient control amount to achieve the target yaw rate change rate.

14. The vehicle left-right wheel drive force distribution control apparatus according to claim 8, wherein the left-right drive force difference transient control amount computing section is further programmed to determine a turning operation of the steering wheel with respect to the center position based on a steering speed.

15. The vehicle left-right wheel drive force distribution control apparatus according to claim 14, further comprising a target yaw rate change rate computing section programmed to compute a change rate of a target yaw rate in accordance with a change of a vehicle operating condition, the left-right drive force difference transient control amount computing section being further programmed to compute the left-right drive force difference transient control amount to achieve the target yaw rate change rate.

16. The vehicle left-right wheel drive force distribution control apparatus according to claim 8, further comprising a target yaw rate change rate computing section programmed to compute a change rate of a target yaw rate in accordance with a change of a vehicle operating condition, the left-right drive force difference transient control amount computing section being further programmed to compute the left-right drive force difference transient control amount to achieve the target yaw rate change rate.

* * * * *